Jan. 5, 1971     G. ALTMAN     3,552,822
REAR PROJECTION SCREEN
Filed June 7, 1968

INVENTOR
Gerald Altman
BY
Morse, Altman & Oates
ATTORNEYS

3,552,822
REAR PROJECTION SCREEN
Gerald Altman, 41 Westminster Road,
Newton, Mass. 02159
Continuation-in-part of application Ser. No. 531,298,
Mar. 2, 1966. This application June 7, 1968, Ser.
No. 735,237
Int. Cl. G03b 21/60
U.S. Cl. 350—126         5 Claims

ABSTRACT OF THE DISCLOSURE

A rear projection screen of high efficiency is constructed with a refracting microsphere component which includes a distribution of microspheres on a transparent support and an antireflection component which is not adverse to high optical transmissivity for light from a projector and which enhances transmissivity and/or absorbtivity for light emanating from the general direction of an observer.

This application is a continuation-in-part of U.S. patent application Ser. No. 531,298, filed Mar. 2, 1966, now Pat. No. 3,388,027.

BACKGROUND AND SUMMARY

The present invention relates to rear projection screens of the type by which an image projected by illuminating light onto one surface may be viewed by imaging light emanating from the other surface.

A primary object of the present invention is to provide, in an optical projection system having a source of illumination, a support for a visual representation to be imaged, and a refracting lens system for focusing imaging light, in association with a rear projection screen comprising a refracting component including a distribution of refracting microspheres that are capable of presenting such imaging light as a bright image and an anti-reflection component that minimizes degradation of the image by light incident on the projection screen from the face presented to an observer.

Other objects of the present invention will in part be obvious and will in part appear hereinafter.

The invention accordingly comprises the devices and products having the components and relationships, which are set forth in the accompanying disclosure, the scope of which will be indicated in the claims.

DETAILED DESCRIPTION OF THE DRAWINGS

Figure 1:
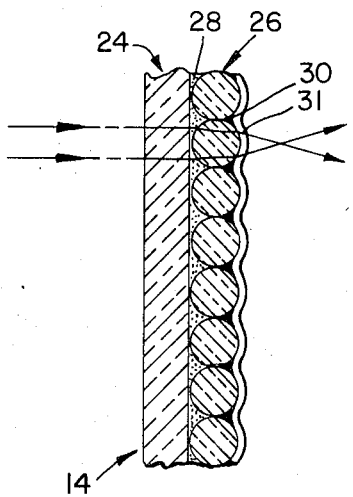
Figure 2:

For a fuller understanding of the nature and the objects of the present invention, reference is to be had to the following detailed description, taken in connection with the accompanying drawing, wherein:

FIG. 1 is an exaggerated cross-sectional view of a rear projection screen embodying the present invention; and FIG. 2 is an exaggerated cross-sectional view of an alternative component of the rear projection screen of FIG. 1.

DETAILED DESCRIPTION

As shown in FIG. 1, rear projection screen 14 comprises a support 24 in the form of a rigid plate, composed of plastic or glass, and a monolayer 26 of microspheres, composed of glass. Microspheres 26 and support 24 are bonded to each other by a suitable adhesive 28, for example, a pressure sensitive adhesive, which constitutes in effect a component of support 24. The interstices between the microspheres at the forward face of rear projection screen 14 are filled with a light absorbing medium 30, composed for example of a black dye or black pigment. Coated onto the forward surfaces of microsphere monolayer 26 is an antireflection stratum 31 having a thickness at most ¼ wave length with respect to the sodium D line. In the alternative embodiment of FIG. 2, the microspheres are treated chemically before being deposited in such a way as to change the chemical character and, therefore, to reduce the index of refraction of a thin outer shell 27 of each microsphere, each thin outer shell being less than ¼ wave length in thickness. In one such modification, antireflection stratum 31 is eliminated, the inner spherical core of each microsphere has an index of refraction ($N_D$) of 1.9 and the outer shell 27 has an index of refraction ($N_D$) of 1.5. Such microspheres are disclosed in U.S. Pat. No. 2,713,286, issued in the name of Nelson W. Taylor on July 19, 1955 for Reflex Light Reflectors and Glass Bead Elements Thereof. As shown, rays of light from the projector impinging upon one of the microspheres are focused thereby for transmission through a portion of the microsphere surface that is not obscured by absorbing material 30. It is preferred that the index of refraction ($N_D$) of the microspheres is within the range 1.8 to 2.2. The area concentration of the microspheres is maximized to achieve a covering power preferably of at least 90%, there being a range of larger microspheres which are virtually in contact with each other, i.e. no more than 10% of their average diameter apart, and a range of smaller microspheres which cover the interstices defined by three or more adjacent larger microspheres. These rays are spread in such a way as to present an image when the front surface of rear projection screen 14 is observed. On the other hand, a ray of light incident upon the front surface of rear projection screen 14, either will be absorbed by light absorbing material 30 or will be transmitted through the microsphere monolayer and the support stratum into the interior of housing 10, where it can not degrade the image observed on rear projection screen 14.

Examples of the materials of which the components of rear projection screen 14 are composed are as follows. Support 14 is a plate of glass or a plastic such as methyl methacrylate having an index of refraction ($N_D$) of approximately 1.5. Adhesive 28 is a mixture of latex in a non-drying organic solvent microspheres 26 have an index of refraction ($N_D$) of approximately 1.9 and range in diameter between approximately 1 and 30 microns. Opaque absorbing material 30 is composed of particulate carbon dispersed in an organic vehicle such as an aliphatic wax or oil, for example, linseed oil. Antireflection stratum 31 is in the form of the plastic residue of a very dilute organic solution such as methyl methacrylate in acetone.

FIG. 3 illustrates one form of the print shown at 12 in FIG. 1. FIG. 3 comprises, in laminated sequence, a support stratum 34, a metal reflecting stratum 36 and a photographic stratum 32. FIG. 4 illustrates an alternative form of the print shown at 12 in FIG. 1. The print of FIG. 4 comprises, in laminated sequence, a support stratum 46, a monolayer of microspheres 42 and a photographic stratum 38. The foregoing three strata are bonded together by a suitable adhesive 40 and the microspheres are backed by an evaporated layer reflecting metal 44.

OPERATION AND CONCLUSION

In operation, illuminating light from a suitable lamp is directed via a visual subject and a lens system to rear projection screen 14, at which it is transmitted by plate 24, adhesive 28, microspheres 26, and anti-reflection stratum 31, and at which it is absorbed by opaque medium 30. An excellent visual image of the subject results. Since certain changes may be made in the above disclosure without departing from the scope of the invention herein involved, it is intended that all matter described in the

What is claimed is:

1. A rear projection screen comprising a sheet having an imaging light receiving inner face and an imaging light conveying outer face, said sheet being transparent, said inner face transparently transmitting said imaging light into said sheet, said outer face transparently transmitting said imaging light from said sheet, an adhesive coating on said outer face, said adhesive coating being transparent, a microsphere monolyare coating on said adhesive coating, the microspheres of said monolayer coating characteristically being composed of transparent glass and characteristically having interstices thereamong, and an opaque medium disposed only in said interstices, whereby said microspheres present imaging light directed thereto and said opaque medium obscures imaging light directed thereto.

2. The rear projection screen of claim 1 wherein said adhesive coating is pressure sensitive.

3. The rear projection screen of claim 1 wherein said microspheres have an index of refraction ($N_D$) ranging from 1.8 to 2.2.

4. The rear projection screen of claim 3 wherein the outer surfaces of said microspheres are coated with an antireflection stratum.

5. The rear projection screen of claim 3 wherein said opaque medium is a black pigment.

References Cited

UNITED STATES PATENTS

| | | | |
|---|---|---|---|
| 2,326,042 | 8/1943 | Lessman | 353—78X |
| 2,706,262 | 4/1955 | Barnes | 350—126X |
| 3,087,382 | 4/1963 | Nygorden | 353—67 |

SAMUEL S. MATTHEWS, Primary Examiner

U.S. Cl. X.R.

117—33.3; 161—6, 3.5; 353—67, 77